UNITED STATES PATENT OFFICE.

HENRY ROUS, OF LONDON, ENGLAND.

COMPOSITION OF MATTER FOR FIREPROOFING.

SPECIFICATION forming part of Letters Patent No. 613,941, dated November 8, 1898.

Application filed March 14, 1898. Serial No. 673,793. (No specimens.)

*To all whom it may concern:*

Be it known that I, HENRY ROUS, a subject of the Queen of Great Britain, residing at London, in the county of Middlesex, England, have invented a new and useful Fireproof Composition of Matter to be Used in the Construction of Fireproof Buildings and Structures, of which the following is a specification.

My composition consists of the following ingredients combined in about the proportions stated, viz: I take of water, say, five gallons and dissolve therein three pounds of size. I then add six and one-half ounces of saturated solution of ammonia and thirteen ounces of saturated solution of caustic potash, four pounds of common soda, three and one-half pounds of ground or pulverized alum, and one and one-half pounds of tungstate of soda, and thoroughly mingle these various ingredients by agitation. I then add about one bushel of hay-chaff, and allow the mixture to stand until the chaff is thoroughly saturated. I then add about half a bushel of slaked lime and thoroughly mix the same with the other ingredients, after which the composition is ready for use.

When used while in a plastic state for filling in walls, ceilings, doors, staircases, and other like purposes, the wood absorbs the moisture exuding therefrom and is thereby rendered fireproof. The composition may also be used when dry, either in sheets or slabs or in any other convenient form or broken up so as to form a rubble or otherwise.

What I claim, and desire to secure by Letters Patent of the United States, is—

The herein-described composition of matter consisting of water, size, ammonia, caustic potash, common soda, alum, tungstate of soda, hay-chaff and slaked lime, combined in about the proportions hereinbefore specified.

HENRY ROUS.

Witnesses:
AUGT. SHIRLEY BOWDEN,
RENÉ BOWDEN.